(12) United States Patent
Garypie et al.

(10) Patent No.: US 6,941,196 B1
(45) Date of Patent: Sep. 6, 2005

(54) MODIFIED THREE LOBE SEARCH METHOD

(75) Inventors: Stephen A. Garypie, Garden City, NY (US); Steven Kelmenson, Hicksville, NY (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 20 days.

(21) Appl. No.: 10/756,885

(22) Filed: Jan. 13, 2004

(51) Int. Cl.[7] .................... G01S 15/00; G01S 13/08; G01S 13/58
(52) U.S. Cl. .................. 701/21; 367/89; 367/91; 73/488; 342/104; 342/108
(58) Field of Search .................. 701/21; 367/89, 367/91; 73/486; 342/104, 108

(56) References Cited

U.S. PATENT DOCUMENTS

| 4,041,293 A | * | 8/1977 | Kihlberg ................. 702/143 |
| 4,244,026 A | * | 1/1981 | Dickey, Jr. .............. 702/143 |
| 5,381,384 A | | 1/1995 | Winje ...................... 367/89 |
| 5,422,860 A | * | 6/1995 | Bradley et al. ........... 367/89 |
| 5,440,311 A | * | 8/1995 | Gallagher et al. ......... 342/132 |

* cited by examiner

Primary Examiner—Thomas G. Black
Assistant Examiner—Brian Broadhead

(57) ABSTRACT

A method of finding a vertical velocity of a vehicle by first forming two cost functions from three pulse return times. An independently determined approximate vertical velocity and a Fletcher-Powell estimation technique are used on the first cost function, to select a minimum velocity of the first cost function. The selected minimum velocity, two calculated velocities from the selected minimum velocity, and a Fletcher-Powell estimation technique are used on the second cost function, to select a minimum velocity of the second cost function. The selected minimum velocity of the second cost function is taken as the vertical velocity of the vehicle.

3 Claims, 11 Drawing Sheets

STANDARD THREE LOBE SEARCH

MODIFIED THREE LOBE SEARCH

MODIFIED THREE LOBE SEARCH METHOD

BACKGROUND OF THE INVENTION

In a first prior method, vertical velocity of a vehicle was determined. This method is taught in U.S. Pat. No. 5,381,384, issued Jan. 10, 1995. The teachings of the '384 patent are incorporated herein by reference.

In the first prior method, a first cost curve was generated from a first cost function. The first cost function was generated from a first correlation time between two of three bottom return pulses, such as the first and second bottom return pulses. A second cost curve was generated from a second cost function. The second cost function was generated from a second correlation time between another two of the three bottom return pulses, such as the first and third bottom return pulses.

In the first method, a combined cost curve was generated by using the cost value of either the first or second cost function, depending on whether the value of the first cost function at a particular vertical velocity was lower or higher than the value of the second cost function at that particular vertical velocity. The velocity at the absolute minimum of the combined cost curve was then taken as the true vertical velocity of the vehicle.

In a second prior method, vertical velocity of a vehicle was determined. An independently approximated vertical velocity VEC was used. A velocity increment (delta Vn) was determined based on a first time TA. The velocity increment was added and subtracted from the approximated vertical velocity VEC, in order to produce side velocities.

In the second prior method, a Fletcher-Powell estimation technique was then used on a first cost function, at each of these three velocities VEC, VEC+ delta Vn and VEC− delta Vn, to find minimum cost values of three lobes of the first cost function. Normally three minimum cost values, i.e. costs, of the first cost function would be determined as a part of the estimation technique. Finding a minimum cost value of a lobe of the first cost function is referred to as a cardinal search. The three minimum cost values are found as a result of three cardinal, that is linear, searches on the first cost function. Three minimum-related cardinal direction search velocities, associated with the three cost minimum values of the first cost function, were also found. Three lobes of the first cost function will usually be associated with the three cardinal search velocities.

In the second method, the resultant three cardinal search velocities were then used in a second cost function. Three other minimum cost values, for the second cost function, were found, using the Fletcher-Powell estimation technique with each of these three cardinal direction velocities. These latter three searches on the second cost function are referred to as optimal or non-linear searches. These three optimal direction searches produces three optimal direction search velocities. The three optimal search velocities were identified at these latter three minimum cost values of the second cost function. Three lobes of the second cost function will usually be associated with the three optimal direction search velocities. The three velocities that produced the lowest minimum cost values for the three lobes (i.e. lobe values) of the first cost function Y, and the three velocities that produced the lowest minimum cost values for the three lobes (i.e. lobe values) of the second cost function were compared and one velocity was taken as the true vertical velocity.

Before the lobe that is at the true velocity could be chosen, the second method required that three minimum velocities, VMF1, VMF2 and VMF3 of the first cost function Y be found. These three calculations were made even though only one value (i.e. lobe) of the first cost curve Y is at the true velocity.

In the second method, the non-linear, optimal, search used a second cost curve to resolve ambiguities in the vertical channel.

Again this second method, using extensive lobe searching, began with an initial estimate of velocity (VEC) used to determine the minimum velocities (VMF1, VMF2, VMF3). By moving plus and minus of the velocity VEC, a total of three velocities, and normally three lobes, were chosen as possible candidates for determining the location of the true cost function minimum.

The second method used an algorithm to search for the minimum cost on each of the three lobes of the first cost function. The second method used both linear and non-linear direction searches, referred to as cardinal and optimal searches respectively.

In the second method, before the lobe containing the true cost function minimum could be chosen, the three lobe search algorithm required that detailed searching be performed on three lobes of both cost curves. Thus a highly refined cost minimum was determined for each of the three lobes of each of two cost functions under consideration, even though only one lobe contains the true cost function minimum.

In the present method, a main lobe velocity VMF is found. Further there are significantly different processing steps from the processing steps of the second method. The present method takes increased advantage of the a priori knowledge, i.e. an independently determined approximate velocity, concerning the cost function sensitivity to the parameters being estimated. That is, the independent knowledge of the approximate vertical velocity is further used to speed up processing. As a result of this knowledge, it is possible to reduce the processing steps used in the brut force application of the estimate technique.

In the present method, ambiguities in the vertical velocity are resolved by the use of a Fletcher-Powell interation technique on a single lobe of each of first cost function Y and second cost function Y'.

In the earlier second method, a Fletcher-Powell interation technique was performed on three lobes of each of first cost function Y and second cost function Y'.

Thus, in the present method, a lobe minimum is found in cost function Y near only the initial estimated velocity, VEC. The velocity at this lobe mimimum is a main lobe veolcity VMF. In the earlier second method a lobe minimum in cost function Y was found near each of VEC, VEC+delta Vn and VEC−delta Vn, were delta Vn is a calculated velocity increment.

In the present invention, lobe spacing is used with main lobe velocity VMF, to provide three new velocities at which to calculate three cost values of the second cost function Y', but not the first cost function.

In the earlier second method lobe spacing is used with initial estimated velocity VEC, to provide for three estimated input velocities at which to find minima in cost values on three lobes of the first cost function Y and on three lobes of the second cost function.

Again, in the present invention, lobe selection is used on three lobes of the second cost function Y', but not on three lobes of the first cost function Y.

Again, in the earlier second method, lobe selection is used on three lobes of the first cost function Y and on three lobes of the second cost function Y'.

Detailed Description of the Earlier Second Method:

The earlier second method used a Fletcher-Powell iteration function. The interation function estimated a sonar velocity, VMF, from each set of correlation data arrays, AMAT, in a receive window. This sonar velocity estimate is the result of a maximum likelihood estimator implemented using a Fletcher-Powell interation technique. This estimator minimizes a cost function Y that relates a correlation data array and a mathematical model of of that data array. The model is a function of sonar velocity, the varible in the iteration process. The resulting velocity VMF has an ambiguity in the eta direction (near vertical) that is resolved.

The primary outputs were VMF and NVA. If the speed of sound (C) received from the Receiver Control and Display Console (RC/DC) is negative, Fletcher-Powell sends the message TMALF to the NSP and uses |C|.

Each sonar velocity results from two activities: the first determines velocities that correspond to minimum cost on each of three chosen ambiguous velocity lobes and the second resolves the ambiguities. Cost, a function of velocity, is a measure of the similarity between the sonar data array (AMAT) and a mathematic model (RMAT) of that data array. This model, RMAT, is a function of velocity, hydrophone channel pairs (ICORR or ICORR6), the three returns [P1(N), P2(N), P3(N)] and the power scaling factor (BIG). Cost is minimized by iteratively varying the velocity assumption of the model until a cost minimum is achieved, within some convergence criteria. This iteration procedure incorporates a Fletcher-Powell minimization technique.

The Fletcher-Powell algorithm involves two different functional iteration loops. These loops were loops #1 and #2. The Fletcher-Powell algorithm consists of a sequence of cardinal searches, each for a cost function minimum in a sequentially chosen direction. Each cardinal search requires multiple iterations though loop #1 before a cost minimum is found. The search is a step—step search; each step requires one circuit of loop #1. Whenever a cost minimum is found by a cardinal search, the Fletcher-Powell algorithm shall execute a single cycle through loop #2, which determines an optimal direction. After that single circuit of the Update Direction loop (#2) the algorithm shall return, via the Linear Search function to the Linear Search Loop (#1) for another cardinal search for a cost minimum. Again, multiple circuits about loop #1 may be expected before another cost minimum prompts another single circuit about loop #2. This sequence shall repeat until a check reveals that the set of convergence criteria has been met, signifying that a cost minimum has been found. At that point, the Fletcher-Powell algorithm shall be exited, and loop #3, the Lobe Search Loop, entered.

There is one circuit through loop #3, the last step of that loop transitions to another lobe of the cost function and reenters the Fletcher-Powell algorithm for the new lobe, via the Linear Search function in loop #1. The Fletcher-Powell algorithm, with multiple cardinal searches, each of multiple circuits about loop #1 followed by a single circuit about loop #2, is executed three times, (once for each of three lobes of the cost function) before the true cost minimum is selected.

A more detailed discussion of each of the four loops of the earlier second technique follows:

Linear Search Loop

A typical sequence through the loop commences with a velocity, V(N), being provided to the Form R Matrix function by the Linear Search Function. For any velocity V(N), the Form R Matrix function shall form a 6×6 R-matrix. (All R matrices shall be formed using the correlation time CT(N) unless otherwise specified.) Availability of the R matrix shall prompt computation of the cost, Y. The Linear Search function shall combine this cost, and its associated velocity V(N), with corresponding data from previous circuits around this loop, and shall examine the combination for a cost minimum using either a quadratic or cubic fit, depending on the amount of data available. If a fit with an interpolative minimum is found, the velocity of the minimum VMIN(M) shall be determined and this loop exited. If a fit with an extrapolative minimum is found, the distance (XMIN) of the extrapolated minimum along the direction of search and an algebraic approximation of the second derivative (AMIN(M)) in the direction of search at the point XMIN shall be made available to the Compute Step size function. Compute Step Size shall respond with the size of the next increment of velocity in the direction of search indicated by PUNIT; the Linear Search function shall convert this to a new velocity, V(N+1), and the processes shall be repeated, until an interpolative minimum is found.

There are just a few details required to complete this picture:

a) The Fletcher-Powell sequence shall initially be entered by entering a velocity VEC into the Form R Matrix function. VEC is used as initial values for V(N) and VMIN(N).
V(N)=VEC N=O
VMIN(M)=VEC M=O b) The velocity which will commence any cardinal search after the first one is the VMIN(M>O) found during the previous cardinal search.

c) During the first loop circuit of the cardinal search, the Compute Cost and Partials function shall compute the cost gradient GRAD(M) at the point VMIN(M).

Direction Update Loop

When the Cardinal Search function outputs VMIN(M) at the end of any cardinal search, a quite different loop is entered for one circuit. This loop is the Direction Update Loop.

VMIN(M) from the Cardinal Search function shall prompt the Compute Cost and Partials function to use the R matrix at VMIN(M) to determine the partials are used to form or update the H matrix. If the H matrix has been initially completed, (i.e., if the first three cardinal direction searches are complete), and GRAD(M) shall be used together by the Determine Next Direction and distance of the cost minimum in three dimensional velocity space. (PUNIT in the unit vector in that direction, PNORM is the magnitude.) PUNIT provides the Cardinal Search function with next direction of search; PNORM provides the Compute Step Size function with the remaining information it needs to compute the next step size, S(M,N). Since prior to completion of the first three cardinal searches the H matrix is not complete, it cannot be used initially to determine an optimal search direction. Therefore, the directions of the first three cardinal searches shall be the cardinal directions in the sequence: vertical direction (that is n), second orthogonal direction (that is u), third orthogonal direction (that is e), and the step size shall be determined independent of PNORM.

At the end of any cardinal search the Cardinal Search function shall compare the vector (VMIN(M)−VMIN(M−1)) to the Convergence Criteria. If all components of this vector meet the convergence Criteria, VMIN(M) shall be output as VMF. If that vector does not meet the convergence criteria, then PSHIF, when it is output by the Determine Next Direction function, shall be compared to the Convergence Criteria by the Cardinal Search function. If all components of PSHIF meet the Convergence Criteria, VMIN(M) shall be output as VMF. If the Convergence Criteria are not met, the linear search loop shall be reentered and iterated until VMIN(M+1) is found, unless the velocity iteration limit has been reached. When the iteration count exceeds the limit, the algorithm aborts and the processing shall continue with the next lobe.

VMF represents the culmination of the Fletcher-Powell algorithm in that it is the velocity at minimum cost on the lobe.

Lobe Search Loop

Superimposed on the Fletcher-Powell algorithm is the requirement to resolve the velocity/cost ambiguity which exists along the n axis (that is, n direction or vertical direction) of the eta coordinate system. Lobe searching shall only be performed if CZ>0.2 seconds. The resulting velocity is identified a VEF. If CZ≦0.2 sec, lobe searching shall not be performed. In that case the velocity reported as VMF for the first lobe examined shall be VEF. VAF, the sonar velocity in array coordinates, shall be computed from VEF using PHI and GAM.

The velocity estimation process estimates sonar velocities in the eta coordinate system. Two coordinates, Vu and Ve, form a plane normal to the direction of sound wave propagation from the bottom. The third coordinate, Vn, is along the signal direction from the bottom. Estimates of Vu, Ve, and Vn are determined by minimizing a maximum likelihood cost function relating the date array A and its mathematical model R, a function of Vu, Ve, and Vn. Vn and Ve are primarily determined from the amplitude of the correlation data array. Vn is determined from the phase of this complex matrix and thus has ambiguities corresponding to every 2 pi of phase. The period of the ambiguity lobes [Co/(2fo(CT(N))] is inversely proportional to the correlation time.

Cost function Y varies with the out-of-plane velocity component Vn. Note that there are many relative minima in cost function Y. Ideally, the estimation process has to locate three minima of a cost function Y, calculate the residual cost of each minimum, and select the minimum with the smallest residual cost. These minima have nearly the same residual cost, close enough that in the presence of noise, selecting the right minimum is difficult.

The key to the solution is the fact that the lobe separation is inversely proportional to the correlation time $$DVEFn=[Co/(2fo*10^3(TA))].$$

The ambiguity described above is resolved by using a second matrix AP (used to express cost function Y1). Two data arrays, A and AP, are formed from three returns, each with a different correlation time (TA and TA1).

A cost function is associated with each data array. Note that only on the correct lobes of the two cost function Y and Y' do the minima "line-up" (i.e., the correct Vn will be a minimum on both cost functions).

Superimposing the two cost functions produces the velocity VEF at the proper minimum of the three lobes. Two costs Y using TA and Y' using TA1 shall be computed and the larger kept. Both of these shall use 10×10 matrices. Then Vn shall be incremented one lobe to the left and on that lobe the velocity of minimum cost shall be found using the Fletcher-Powell algorithm. At that minimum also two costs Y and Y' shall be computed, using 10×10 matrices, one using TA. Again the larger shall be saved. Then Vn shall be incremented two lobes to the right and again the velocity of minimum cost shall be found using the Fletcher-Powell algorithm. At that minimum also two costs Y and Y' shall be computed using 10×10 matrices, one using TA. Again the larger shall be saved. The velocity of the smallest cost saved shall be selected as the minimum cost velocity VEF.

Implementation of this solution is within a functional structure. When the Linear Search function outputs VMF it shall be used by the Form R Matrix function to form a 10×10 R Matrix, using correlation time TA. The Compute Cost and Partials function shall respond to the 10×10 R matrices by computing cost (Y) using those matrices and corresponding 10×10 A and 10×10 AP matrices.

The Find Best Lobe function shall compare those two costs, shall save the larger with the corresponding velocity, VMF, and shall send the Form R Matrix function a velocity change, DVEFn, which shall move the search to the next cost lobe. The Form R Matrix function shall respond to this by reentering the linear search loop expressed in FIG. 10 and described previously; i.e., by reentering the Fletcher-Powell algorithm and finding a new cost minimum in three dimensional velocity space on the next cost lobe.

Upon completing the third iteration of the lobe search loop, the Find Best Lobe function identifies the velocity corresponding to the least cost of the three saved VMF's as VEF. After converting VEF to array coordinates it is output as VAF.

During any sequence of Fletcher-Powell computations, certain conditions may occur which may prompt the abandonment of the lobe search or of the velocity estimate. (Such conditions are not necessarily an indication of a malfunction or fault: certain combinations of valid data will not produce a valid convergence of the Fletcher-Powell algorithm.) These conditions include:

a) Singular R Matrix: Computation of the cost requires that the R Matrix be inverted. Should the R Matrix not be invertible the Fletcher-Powell algorithm shall be aborted.

b) Too many cost computations: Should the number of costs computed during any velocity estimation (including all linear searches, all lobes) exceeds 30, the Fletcher-Powell algorithm shall be aborted.

c) Too many shifts: Should the total distance searched (in velocity space) during any cardinal direction linear search be greater than ten times the initial step size; i.e., if $V(N+3)-V(N) \geq 10*S(M,0) M=1, 2$ or $3$ the Fletcher-Powell algorithm shall be aborted.

d) Singular AA Matrix: Computation of the H matrix requires that the matrix of second partial derivatives of cost relative to velocity (the AA matrix) be inverted. Should the AA matrix be singular; i.e., not invertible, the Fletcher-Powell algorithm shall be aborted.

e) As a part of the process of forming the AA matrix the quantities /VMINu(3)−VMINU(O)/ and /VMINe(3)−VMINe(O)/ are both calculated. Should both of these absolute differences be less than $10^{-5}$, the Fletcher-Powell algorithm shall be aborted.

f) Truncation error: During linear search an extrapolation cost minimum (XMIN) is not compatible with a non-negligible increase in cost. Should this occur, a truncation error is said to have occurred and the Fletcher-Powell algorithm shall be aborted.

Should any of these abort conditions occur, and if only one lobe is to be examined; i.e., if CZ≦0.2, the velocity estimate shall be abandoned and processing shall recommence with the next pulse pair.

Should any of these abort conditions occur during search of the first of three lobes to be searched, the velocity estimate shall be abandoned and processing shall recommence with the next pulse pair.

Should any of these abort conditions occur during search of the third of three lobes, the lobe shall be abandoned, VEF shall be chosen from the other two lobes of the estimate, and processing shall proceed to the next pulse pair.

VEM, the number of attempted velocity estimates, NVA, the number of completed velocities, and NUMBORT, the number of aborted attempts, shall be output.

There are other inputs and outputs of the Velocity Estimation process: these must be regarded as necessary by ancillary. A brief discussion of these follows.

VACx and VACy, XSPACE and YSPACE are all used in generating the Convergence Criteria. The quantities listed in the inputs as C, PHI, GAM and DELTAU(PW,m) are all used in generating the R Matrices, the correlation width (PSI), and the phase velocity (Co).

Outputs

Co—Phase velocity magnitude
NVA—Number of velocity estimated actually computed in a window
NUMBORT—Number of aborted velocity attempts in a window
VAF—Sonar Velocity estimate in array coordinates
VEW—Number of attempted velocity estimates in a window
TMALF—Bad thermistor data—use of default speed of sound Find Best Lobe The cost function (i.e. Y or Y') has several ambiguous lobes as a function of the eta velocity component. The cost minimum found by the Fletcher-Powell algorithm may be a local minimum rather than a universal minimum. Find Best Lobe determines the lobe which has the universal minimum.

Processting is as follows: A check of the desired correlation time (CZ) shall be made at the beginning of a window to determine if lobe searching shall not be performed if CZ is less or equal to 0.2 seconds. Lobe searching shall be performed if CZ is greater than 0.2 and no abort has occured in the calculation of VMF for the initial lobe.

When the initial lobe's VMF is obtained, the cost function (Y) values for both the 10 by 10 A and 10 by 10 AP matrices at VMF will be received. The velocity vector and the larger of the two costs shall be compared to other costs as described below.

The lobe search shall be continued by calculating two new eta velocity components, that is Vn(N)=+−[Co/2fo*1000*CT(N)]. Each incrementd velocity will be used in the cost minimization to find the VMF's for the cost function lobes adjacent to the original lobe. These adjacent lobe VMF's will be received along with their associated A and AP data matrices cost function values. For each pair of cost values, the largest one shall be accepted along with the lobe VMF.

The larger cost values for the three lobes shall be compared to find the minimum one. VEF shall be set equal to the VMF of this minimum cost lobe. If lobe searching is not performed, VEF shall be that VMF determined for the initial lobe.

VAF, the sonar velocity in the array coordinates, shall be calculated from VEF as VAF=VEF/T3.T3 is a coordinate transformation matrix. T3 is a function of the eta vector direction angles PHI and GAM. VEW shall be indexed by 1 upon output of VAF.

Counts shall be maintained of the number of velocity estimates attempted during each sonar window (VEW), and of the number of estimates actually completed, NVA. The difference shall be NUMBORT=VEW−NVA.

The present modified three lobe search method employs a time approximately one-half of the time of the two pulses being correlated in order to resolve vertical velocity ambiguity, and then refining the velocity estimate via Fletcher-Powell optimal searches until convergence criteria are met, thus saving about one-half of the processing time orginally required to produce a high quality velocity estimate.

SUMMARY OF THE INVENTION

A modified three lobe search method of finding a vertical velocity of a vehicle, comprising transmitting at least three acoustic pulses from a vehicle submerged in water toward a bottom surface, detecting a returned acoustic pulse due to each of the transmitted acoustic pulses on the vehicle, after the transmitted acoustic pulses are reflected toward the vehicle from the bottom surface, generating a first cost function from a time that is related to said acoustic pulses, obtaining an independently estimated vertical velocity of the vehicle, performing Fletcher-Powell cardinal searches on the first cost function beginning with the independently estimated vertical velocity, to find a main lobe velocity at a minimum value of a lobe of the first cost, adding a lobe spacing velocity increment to the main lobe velocity, to determine a first side lobe velocity, and subtracting a lobe spacing velocity increment from the main lobe velocity, to determine a second side lobe velocity.

DESCRIPTION OF THE PREFERRED EMBODIMENT

The present method comtemplates using apparatus and some method steps of the first earlier method of the '384 patent.

Figure 1:
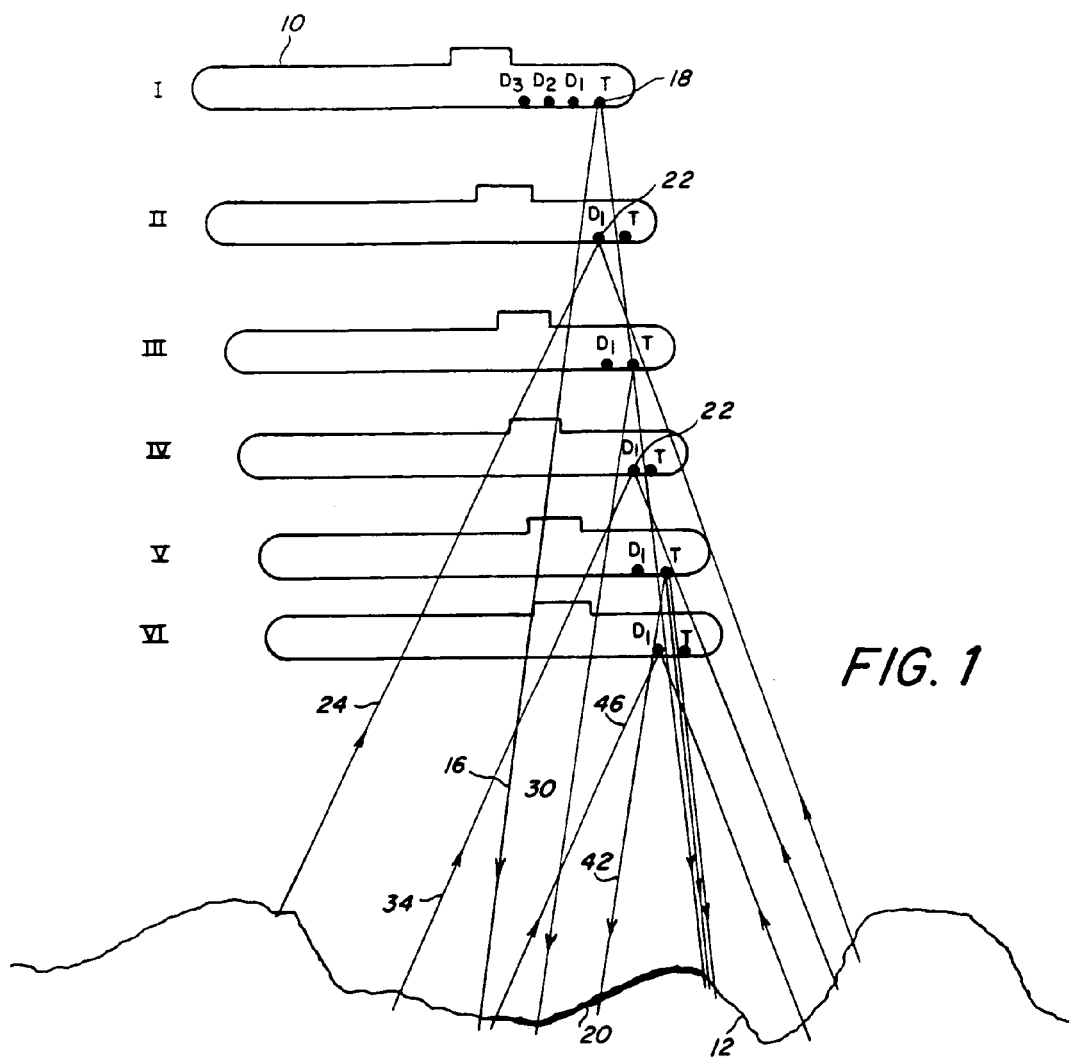
FIG. 1 is a plan view of an underwater vehicle moving in a verticle direction with respect to the ocean floor.
Figure 2:
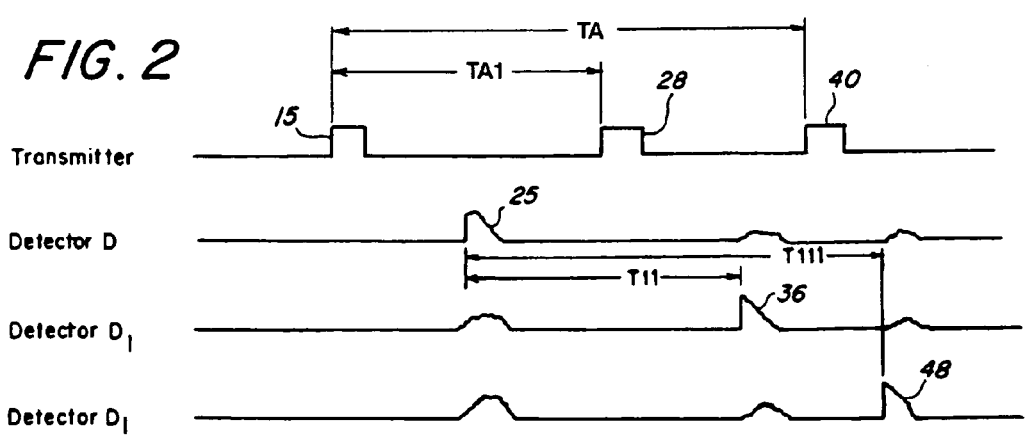
FIG. 2 is a diagrammatic view of three pulses transmitted and received by the moving underwater vehicle of FIG. 1.
Figure 3:
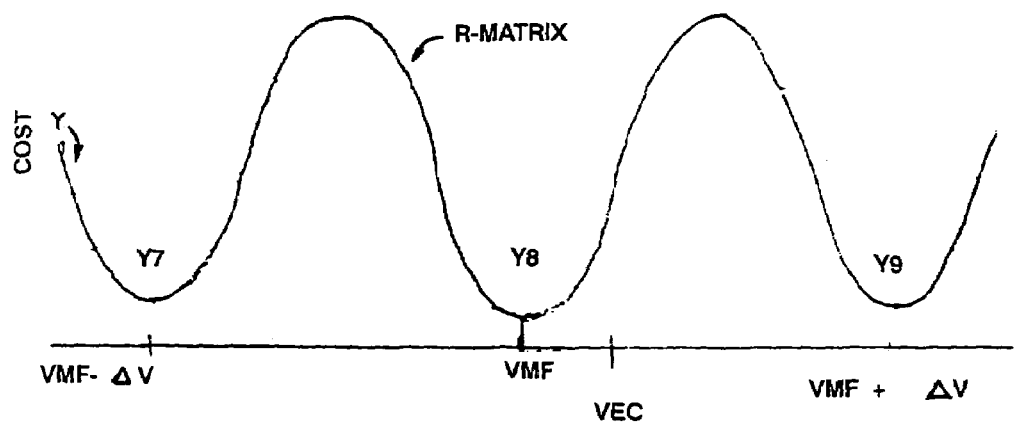
FIG. 3 is a plot of a first cost function generated using a first correlation time TA.
Figure 4:
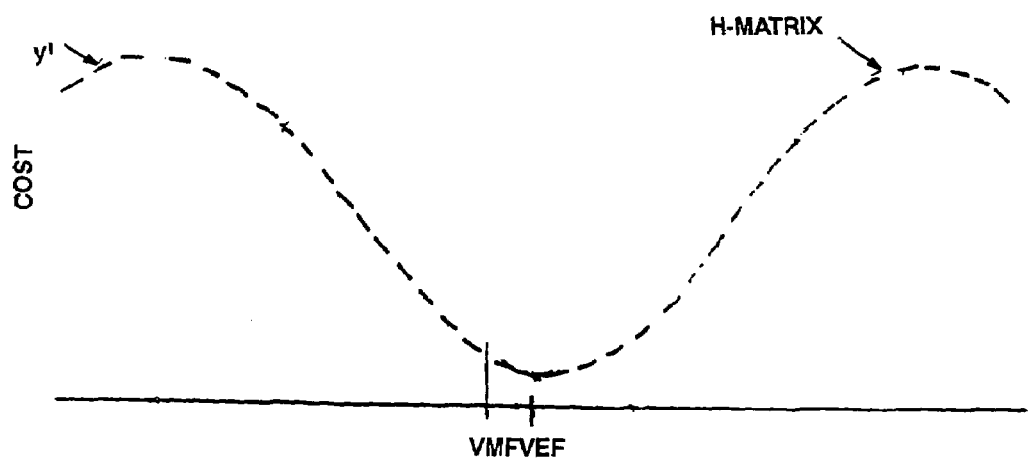
FIG. 4 is a plot of second cost function generated using a second correlation time TA1.

FIG. 1 herein is taught in FIG. 1 of the '384 patent. FIGS. 2, 3 and 4 herein are similar to FIGS. 2, 4 and 3, respectively, of the '384 patent.

First cost function Y of FIG. 3 herein and second cost function Y' of FIG. 4 herein are formed using first and second times TA and TA1, respectively, of FIG. 2 herein. TA and TA1 are approximately equal to first and second correlation times T111 and T11 of FIG. 2 herein. TA and TA1 are the same as correlation times T1 and T, respectively, of the '384 patent.

FIG. 1 herein shows a moving submarine 10. The submarine 10 is shown in six positions designated positions I, II, III, IV, V and VI. The submarine 10 travels from left to right and from top to bottom. The floor of the ocean 12 is roughly parallel with the longitudinal axis of the submarine 10.

When the submarine 10 is in position I, it emits a first transmitted acoustic pulse 15, as shown in FIG. 2 herein. The pulse 15 shown in FIG. 1 herein produces beam 16 coming from transmitter 18. The beam 16 is reflected from an area 20 of the ocean floor 12. A portion of the first transmitted beam 16 is detected by a reference detector D1 when submarine 10 is in position II. The detector beam 24 covers this received portion. The received portion produces a first detected pulse 25, shown in FIG. 2 herein. The detector 22 is also designated D1 since it is the first detector in a line of detectors D1, D2, D3 and D4. A 4×4 array of such detectors can be used to measure velocity in two dimensional space.

When the submarine 10 is in position III, at a time TA1 after the first emission, it emits a second acoustic pulse 28, shown in FIG. 2 herein. The pulse 28 shown in FIG. 2 herein produces beam 30, coming from transmitter 18. The second transmitted beam 30 is reflected from area 20 of the ocean floor 12. A portion of the second transmitted beam 30 is detected by a detector 22 when submarine 10 is in position IV. The beam 34 covers this received portion. The received portion produces a second detection pulse 36, shown in FIG. 2 herein. The second output of detector 22 is processed since the output of this detector, among the outputs of D1, D2, D3 and D4, best correlated with the first reference output of 22. The difference in correlation time, T11, between pulses 25 and 36, is measured. In an algorithm Y', one could use the time TA1, instead of correlation time T11, since the two times are almost the same.

When the submarine 10 is in positon V, it emits a third acoustic pulse 40, shown in FIG. 2 herein. The pulse 40 shown in FIG. 2 herein produces a beam 42 coming from transmitter 18. The third transmitted beam 42 in reflected from area 20 of the floor 12. A portion of the third transmitted beam 42 is detected by detector 22 when submarine 12 is in position VI. The detector beam 46 covers this received portion. The received portion produces a third detected pulse 48 shown in FIG. 2 herein.

The third output of detector 22 is processed since the output of this detector, among the output of D1, D2, D3 and D4, best correlate with the first output of detector 22. The difference in correlation time, T111, between pulses 25 and 48, is measured. In an algorithm Y, one could use the time TA, instead of correlation T111, since the two times are almost the same.

The presently disclosed method for determining vertical velocity, used the following steps. One determines vertical velocity by measuring the number of sound waves lengths or portions of sound wave lengths that submarine 10 has moved vertically in a measured time.

As an example of the the presently disclosed method, a sound wave having a six inch wave length is used. Pulses 15 and 28, chosen as shown in FIG. 2 herein, and each having a 6 inch wave length, are sent out. They had the same phase when sent out, such as zero degrees phase. Pulses 25 and 36 were received. The phase of each pulse 25 and 36 is measured. The frequency of pulses 15 and 28 was chosen as 1,666 cycles per second. The speed of sound, in seawater, is believed to be approximately 10,000 inches per second.

The correlation time T11 between pulses 25 and 36, as shown in FIG. 2, was measured. Correlation time T11, for instance, may be one second. If, for example, the first pulse 25 has a phase of 10 degrees from neutral pressure, and the second pulse 36 has a phase of 40 degrees from neutral pressure, one knows that there is a vertical velocity and the vehicle is moving downward, closer to the points of reflection. One also knows that in the correlation time T11 of one second a 30 or 390 or 750 or 1110 or 1470 degree phase shift has occurred in a round trip, due to the downward motion. This is equal to 15 or 195 or 375 or 555 or 735 degrees in one direction, with respect to the sea bed. Since 15 degrees is one-twenty-fourth of the 6 inch wave length sound wave. Therefore, the vehicle has fallen 0.25 inches or 3.25 inches, or 6.25 inches or 9.25 inches or 12.25 inches in one second. These correspond to possible verticle velocities of 0.014 miles per hour, 0.184 miles per hour, 0.355 miles per hour, 0.525 miles per hour and 0.696 miles per hour. There is thus an ambiguity in the vertical velocity. It in noted that an error in the measurement of correlation time T11 will show up as a phase shift increment.

In order to resolve this ambiguity, pulse 40 was sent out. It had a zero degree phase. It had a frequency of 1,666 cycles per second. It had the same phase as pulses 15 and 28. Pulses 25 and 48 of FIG. 2 herein were then used. If pulse 48 has a phase of 235 degrees and if correlation time T111 is 1.5 seconds, there had been a 225 or 585 or 945, or 1305 or 1665 or 2025 degree phase shift in a round trip in 1.5 seconds, between pulses 25 and 48, due to the downward motion. One also knows that the vehicle has changes 112.5 or 292.5 or 472.5 or 652.5 or 832.5 or 1012.5 degrees in 1.5 seconds with respect to the sea bed. Therefore, the vehicle has fallen 1.875 or 4.875 or 7.876 or 10.875 or 13.875 or 16.875 inches in 1.5 seconds. These distances correspond to vertical velocities of 0.071 miles per hour, 0.184 miles per hour, 0.298 miles per hour or 0.412 or 0.525 or 0.639 miles per hour. The true vertical velocity is 0.184 miles per hour since the two above calculations agree at that vertical velocity value. The 0.184 miles per hour vertical velocity is selected over the next possible vertical velocity value of 0.525 miles per hour, since the amplitude of each of the cost function curves in FIGS. 3 and 4 herein decreases, as the possible vertical velocities increase and decrease from zero vertical velocity.

A first cost function Y of FIG. 3 herein, expresses correlation versus vertical velocity for pulses 25 and 48. Y is stated below. This first cost function Y of FIG. 3 herein uses the measured phase shift p and time TA, which time TA is approximately equal to T111. As described above, where the time T111 between pulses 25 and 48 is 1.5 seconds and the measured phase shift p is 225 degrees, the expression Y is at minimum at possible vertical velocity values of 0.071 miles per hour, 0.184 miles per hour, 0.298 miles per hour, 0.412 miles per hour and 0.523 miles per hour. One of these velocities is the true vertical velocity value.

A second cost function Y' of FIG. 4 herein, expresses correlation between pulses 25 and 36 versus vertical velocity Vn. Y' can be used in resolving the ambiguity as to vertical velocity found in Y. This function Y' of FIG. 4 herein uses the measured phase shift p1 and time TA1, which time is approximately equal to correlation time T11. As described above, where the time T11 between pulses 25 and 36 is one second and the measured phase shift p' is thirty (30) degrees, the expression Y' will be at a minimum possible vertical velocity values at 0.014 miles per hour, 0.184 miles per hour, 0.355 miles per hour, 0.014 miles per hour, 0.184 miles per hour, 0.355 miles per hour, 0.525 miles per hour and 0.696 miles per hour.

The time TA, which is approximately equal to the correlation time T111 between pulses 25 and 48, can be used in generating ambiguity, or first cost function Y, wherein $$Y = A - B\cos((4Pifo/co)VnTA - p).$$

The time TA1, which is approximately equal to the correlation time T11 between pulses 25 and 36, can be used in generating ambiguity, or second cost function Y', wherein $$Y' = A - B\cos((4Pifo/co)VnTA1 - p1).$$

Vn is the vertical velocity of submarine 10. A and B are slow-varying functions of vertical velocity Vn. A is essentially a constant. B causes the curves in FIGS. 3 and 4 herein to taper in amplitude as they go away from the vertical axis. B is Bo times the natural log of e raised to the minus Vn squared power. Bo is the amplitude at Vn=0. Bo is a scaling factor for the curves in FIGS. 3 and 4 herein. Vn is in miles per hour. co is the phase velocity of sound in seawater at the hydrophone array. fo is the operating frequency of the transmitted pusles. p is the measured phase shift between two correlated received pulses 25 and 48. p1 is the measured phase shift between two correlated received pulses 25 and 36. TA is esstially equal to the correlation time T111 between pulses 25 and 48. TA1 is essentially equal to the correlation time T11 between pulses 25 and 36. Pi is equal to 3.1416.

FIGS. 3 and 4 herein are plots of cost functions Y and Y' versus Vn. The separation, or lobe spacing velocity increment, between minima of lobes in FIG. 3 herein is approximately equal to (co/2foTA). The separation, or lobe spacing velocity increment, between minima of lobes in FIG. 4 herein is approximately equal to (co/2foTA1). The plot of FIG. 3 is referred to as first cost function curve Y. The plot of FIG. 4 is referred to as second cost function curve Y'.

Apparatus and technique with which the earlier first method was practiced, are described in U.S. Pat. No. 4,244,026, issued Jan. 6, 1981. The '026 patent is incorporated herein by reference.

Times TA and TA1 are considered to be equivalent to correlation times T111 and T11, respectively, of FIG. 2 herein. They are the same for each velocity estimate in the receive window and are those determined for the first velocity. Times TA and TA1 for the first window are determined differently from the remaining windows. The particular three returns used for each velocity are dependent not only on the correlation time but also on the number of velocity estimates per window. Using only a portion of the possible number of velocities in a window requires the velocities to be uniformly distributed through the returns across the receive window in order that the velocities be as independent as possible.

Figure 5:
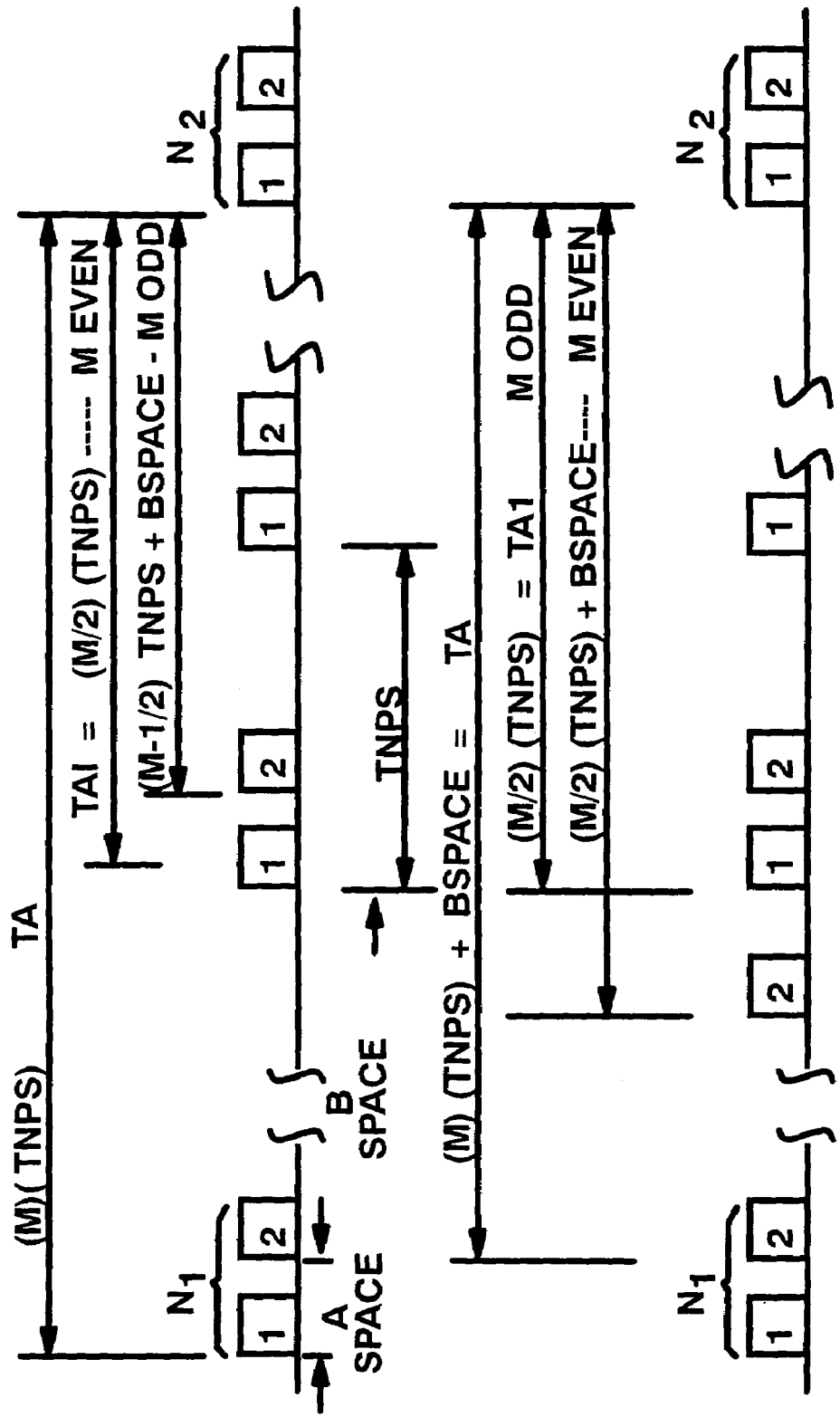
FIG. 5 is a diagram of correlation time configurations.
Figure 6:
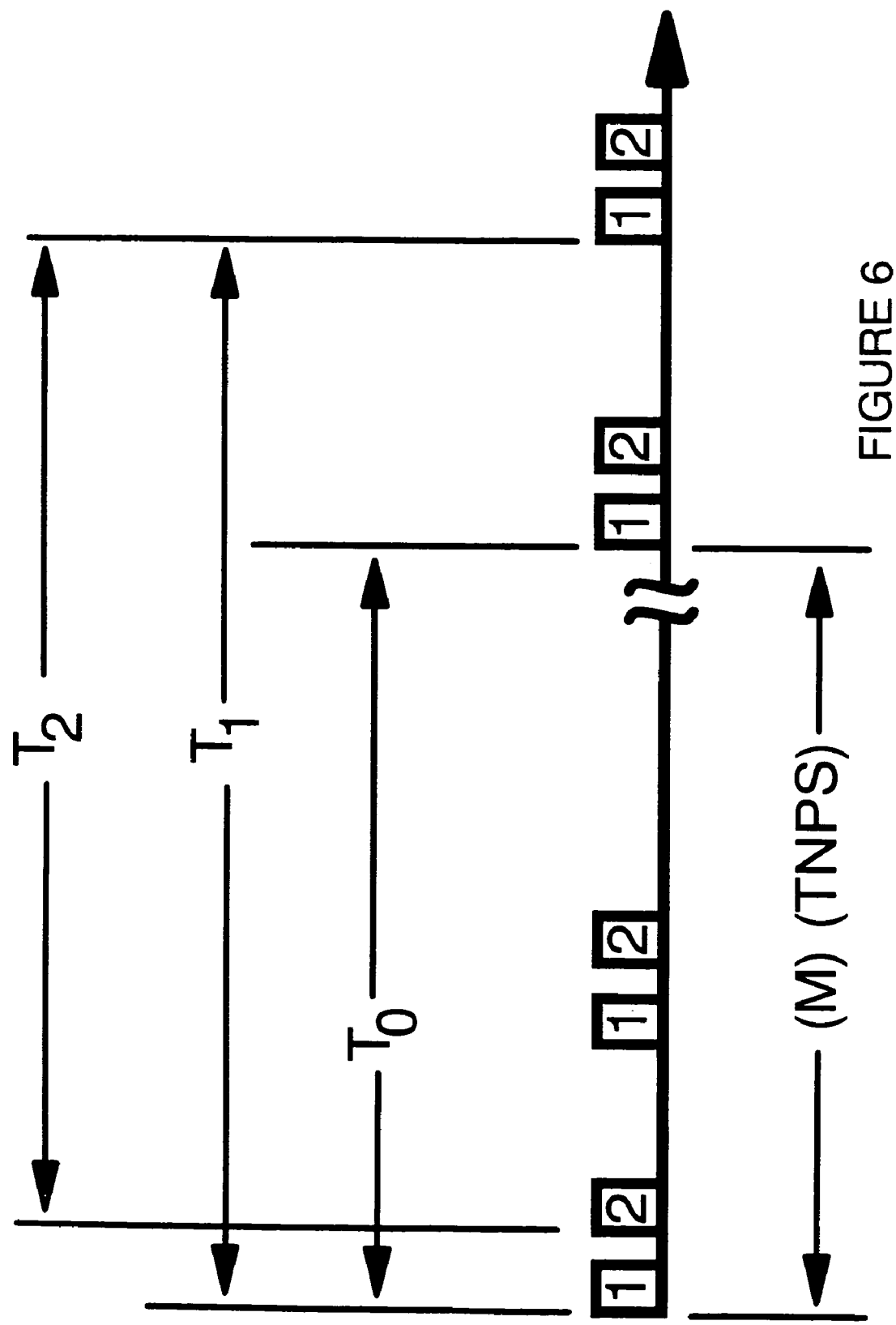
FIG. 6 is a diagram of three candidates for TA.

FIG. 5 shows other possible configurations for times TA and TA1. These times can be selected to put the Separation Vector Position about one spacing from the edge of the array of possible positions. This leads to examining three values for time TA and selecting the one with correction peak nearest to one hydrophone spacing from the edge (FIG. 6). This requires a knowledge of the velocity (VAC$_x$, VAC$_y$) which is the average of the projector velocity at time t$_x$ and the receive array velocity at time t$_y$, in array coordinates. t$_x$ and t$_y$ are unknown and shall be approximated using the correlation time from the previous window, or for the first window, the time spacing between the start of doublets, TNPS.

Figure 7:
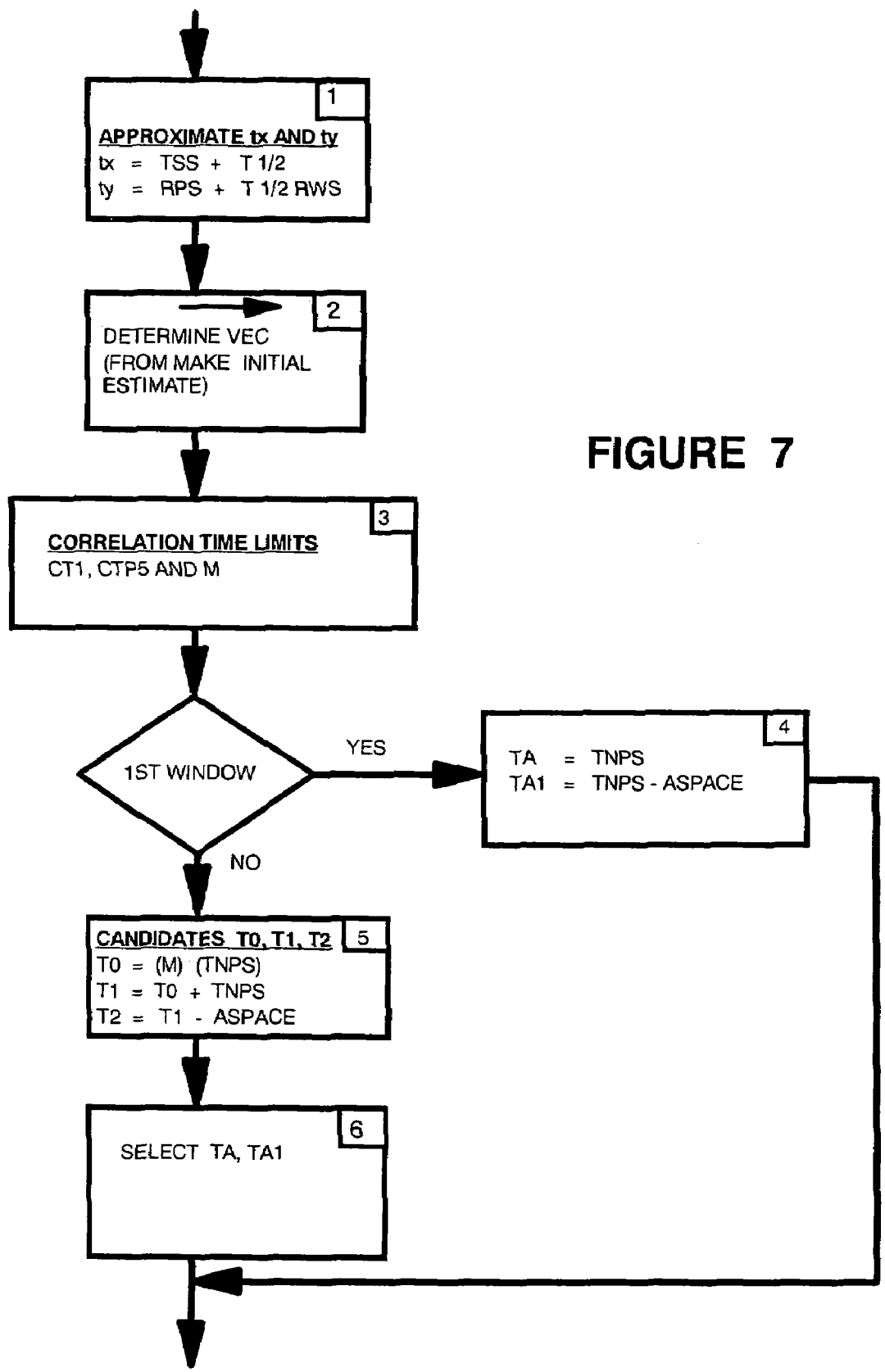
FIG. 7 is a flow diagram for determining TA and TA1.

The times TA and TA1 shall be computed as shown in FIG. 7.

First Window of a Run $NVE = ND+1-M$, when (l=1)

All Other Windows $NVE = ND+1-M$, when $NVA_{l-1}=0$ and l>1, or $NVE = MIN[(NVA_{l-1}+1), (ND+1-M]$ where $NVA_{l-1}>0$ and l>1.

where l is the window number (l=WSEQN).

Since NVE is greater or equal to ND+1−M, greater independence among the sonar velocity estimates is achieved by spreading the estimates throughout the window as uniformally as possible. This shall be accomplished by spacing the first return of each correlation data array on amount M'=TNPS where M' shall be computed as M'=INT[ND/NVE]. The returns used for the Nth velocity estimate in the window shall be identified as P1(N), P2(N), and P'(N). According to FIG. 6, the return number of P1(N) and P'(N) can be either even or odd but the return number of P2(N) is always odd. Any of several methods may be used to determine these parameters. A mathematical approach is as follows:

$$P1(N) = \begin{cases} \{1 + (N-1)M' & \text{for } TA = T0, T1 \\ \{2 + (N-1)M' & \text{for } TA = T2, T3 \end{cases}$$

$$P2(N) = \begin{cases} \{1 + (N-1)M' + 2INT(T0/TNSP) & \text{for } TA = T0 \\ \{1 + (N-1)M' + 2INT(2T1/TNPS) & \text{for } TA = T1 \\ \{2 + (N-1)M' + 2INT(T2/TNPS+1) - 1 & \text{for } TA = T2 \\ \{2 + (N-1)M' + 2INT(T3/TNPS+1) - 1 & \text{for } TA = T3 \end{cases}$$

$$P'(N) = P2(N) - KP$$

A doublet pair (TNPS) consists of a transmitted pulse and received pulse, that is two adjacent pulses that are labeled 1 and 2 in FIG. 5. Correlation time upper limit (CTP5), desired value of correlation time (CT1), and number (M) of doublet periods (TNPS) in CT1 shall be computed as:

$CT1 = \text{Minimum}[Tx1, Ty1, 1 \text{ sec}]$ $CTP5 = \text{Minimum}[TxP5, TyP5, 1 \text{ sec}]$ $M = \text{Maximum}[\text{Integer}(CT1/TNPS), 1]$ where $Tx1 = \{((MAXXSP-1)HSPACE)/(2|VAC_x|)\}$ $Ty1 = \{((MAXYSP-1)HSPACE)/(2|VAC_y|)\}$ $TxP5 = \{((MAXXSP-0.5)HSPACE)/(2|VAC_x|)\}$ $TyP5 = \{((MAXYSP-0.5)HSPACE)/(2|VAC_y|)\}$ TA shall be selected from T0, T1, and T2 as being that nearest to CT1 but less than CTP5.

An algorithm which may be used for this selection is:

|CT1−TA|=Min{|CT1−T0|,|CT1−T1|, if T1<CTP5 or |CT1−T2|, if T2<CTP5}

TA1 shall be selected as follows:
K=M for TA=T0, T2  J=0 for TA=T0, T1
K=M+1 for TA=T1  J=1 for TA=T2

$KP=(INT[(2K+J+1)/2])$ $TA1=(INT[KP+1/2])BSPACE+(INT[KP/2])ASPACE$

Due to a variety of factors, only a portion of the possible velocity estimates in a window may be computed. ND+1−M is the number of possible velocity estimates for this window. The actual number of velocity estimates for the previous window is $NVA_{I-1}$.

This scheme causes TA1 to be approximately TA/2; if deemed necessary this formulation will be modified to produce TA1 =TA/3 or TA/4.

Figure 8:
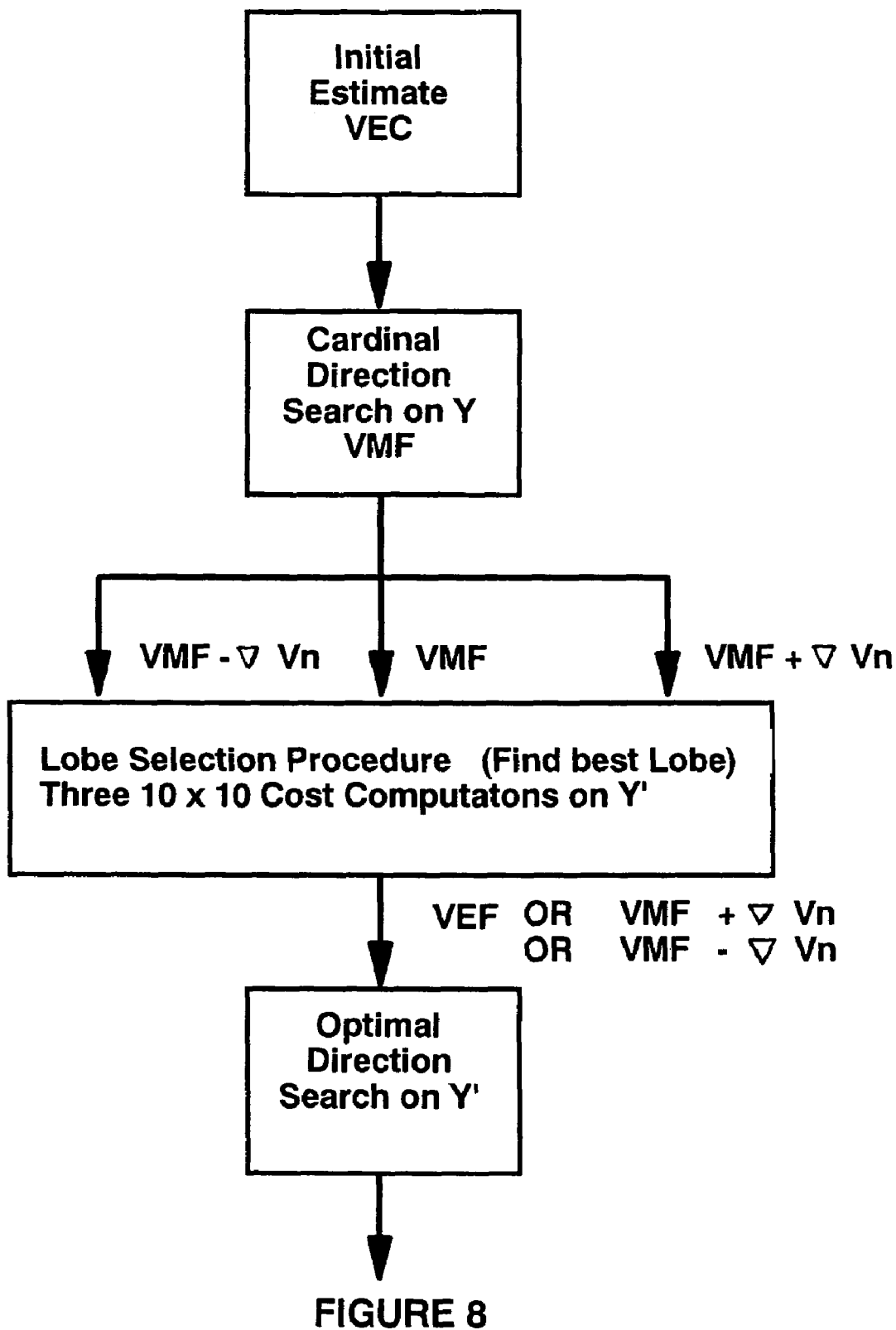
FIG. 8 is a flow diagram of the disclosed modified three lobe technique.

As shown in FIG. 8, the disclosed modified three lobe search method begins with an initial estimate of vertical velocity, referred to as VEC. This estimated velocity VEC is used with a first cost function Y of FIG. 3 herein. The first cost function Y can be expressed in matrix form or trigonometric form. Then the minimum cost value Y(VMF), i.e. minima, of the first cost function Y, is determined by use of a Fletcher-Powell algorithm loop. A main lobe velocity VMF, at value Y(VMF), is determined. This determined velocity VMF is the velocity at the minimum cost value Y(VMF) of the main lobe of cost function Y.

By moving plus and minus of the main lobe velocity VMF by one wavelength of the first cost curve Y, side lobe velocities (VMF+delta Vn, VMF−delta Vn) are chosen. delta Vn=co/2foTA. This wavelength may be referred to as a lobe spacing velocity increment. These side lobe velocities are thus found by moving by the amount of the lobe spacing velocity in a plus and minus direction of the main lobe velocity VMF.

Three cost values Y'(VMF-delta Vn), Y'(VMF) and Y'(VMF+delta Vn) (i.e. lobe values) of the second cost function Y' are then calculated, one value for Y' at the main lobe velocity VMF and a value of Y' at each of the side lobe velocities. The velocities at these three lobe values of Y' are possible candidates as the true velocity.

The cost values Y'(VMF−delta Vn), Y'(VMF) and Y'(VMF+delta Vn) of the three lobes of the second cost function Y' are determined by using the computed main lobe velocity VMF and side lobe velocities. The lobe of Y' is essentially selected by selecting the lowest value of values Y'(VMF−delta Vn), Y'(VMF) and Y' (VMF+delta). Thus a lobe of Y' is essentially chosen in a lobe selection process by means of the cost value selection process. The velocity VMF, VMF+delta Vn, or VMF−delta Vn, at which the value of the cost curve Y' is lowest, is selected. This velocity is chosen as being somewhere within the correct lobe of the second cost function Y'.

This selected velocity, such as VMF, is used in the second cost function Y' to find an absolute minimum value in a lobe of the second cost function Y', said lomb probably containing VMF. The second cost function Y' can be expressed in matrix form or trigonometric form. The value of a velocity at this absolute minimum value of the lobe of the second cost function Y' is taken as the true velocity VEF of vehicle 10.

Again, a selected velocity VMF, VMF+deltaVn or VMF−delta Vn is used with a Fletcher-Powell estmation loop to find the absolute mimimum value of a lobe of the second cost function Y'. The velocity VEF, located at the found absolute minimum value of a lobe of the second cost function Y', is taken as the true velocity.

This new technique, known as the modified three lobe search uses the same cost functions as the second technique. However the new technique uses approximately half of the processing time. This is achieved by applying changed process steps of the second technique. The new technique reduces the number of searches and cost computations which must be performed.

Again, an initial estimate of velocity VEC is used to find a minimum value of a lobe of the first cost curve Y', the lobe being near VEC. A velocity VMF which is at this minimum value of such a lobe of the first cost function Y, is selected.

A Fletcher-Powell cardinal search is performed using the velocity VEC to find the minimum of such a lobe of the first cost curve Y. VMF is referred to as the main lobe velocity. After this has been completed, lobe spacing is applied to calculate side lobe velocities.

The cost values of the second cost curve Y' are calculated at the main lobe velocity and side lobe velocities. The velocity that has the lowest cost value for Y', is selected.

A second loop of the Fletcher-Powell algorithm is applied using this velocity VMF, VMF+delta Vn or VEF−delta Vn and the absolute minimum value of a lobe of the cost function Y' is found. The velocity value VEF at the absolute minimum value of of a lobe of the second cost function Y' is selected as the true velocity VEF. This selected velocity VEF has been found to be as good as the velocity determined by the above described second technique.

The modifications necessary for the disclosed lobe search algorithm have two major components:

(i) The selection of the second correlation time TA1, is significantly changed. The second correlation time is set to approximately equal to one-half of the first correlation time TA.

(ii) The ordering of the Fletcher-Powell and lobe selection algorithms is changed. Previously, the complete Fletcher-Powell algorithm was processed on each of the three lobes of the first and second cost functions and then the answer selected from the six candidate velocities by the lobe selection function. Now, a cardinal search only is processed on the initially estimated velocity VEC to find a main lobe velocity VMF of the first cost curve Y. The side lobe velocities are artificially formed. The velocity, of the three such velocities, that produces the lowest value of the second cost function Y' is then selected. A second Fletcher-Powell estimation loop is applied to the second cost function Y' using the selected velocity, in order to find the true velocity VEF.

The modified three lobe search method changes the processing steps of a least squares estimation technique. The new method takes advantage of apriori knowledge concerning the cost function sensitivity to the parameters being estimated. As a result of this knowledge, it was possible to reduce the processing time for the brute-force application of the estimation technique.

A modified three lobe search method finds the same cost function minimum as the older techniques, but the modified three lobe search method uses approximately half the processing time. This is achieved by using some of the processing steps as before and by adding new processing steps, to reduce the number of searches and cost computations which must be performed.

An initial estimate of velocity of vehicle 10 of FIG. 1 is made, This initial estimated velocity is used to get within a lobe of a first cost function Y. This lobe is referred to as the main lobe. Immediately the Fletcher-Powell Cardinal searches are performed on this lobe to find its absolute minimum value. The velocity at this minimum value of the lobe is the used. This velocity is referred to as the main lobe velocity.

After this has been completed, a lobe spacing step is applied to the main lobe velocity, to determine two side lobe velocities.

Lobe identification is made using these three velocities, to caculate three cost values of a second cost function Y'. The lowest cost value, of the cost values at the three velocities, is chosen, thus indirectly selecting one of these three velocities. A main lobe velocity and its associated lobe of the second cost function Y' of FIG. 4 is thus obtained.

Detailed Fletcher-Powell Optimal searches are applied to this lowest-valued-lobe only at points on Y' around the main lobe velocity, until a second cost function absolute minimum is obtained. The associated velocity of this cost function minimum is taken as the true velocity. This technique has been found to be as good as the earlier techniques.

Figure 9:
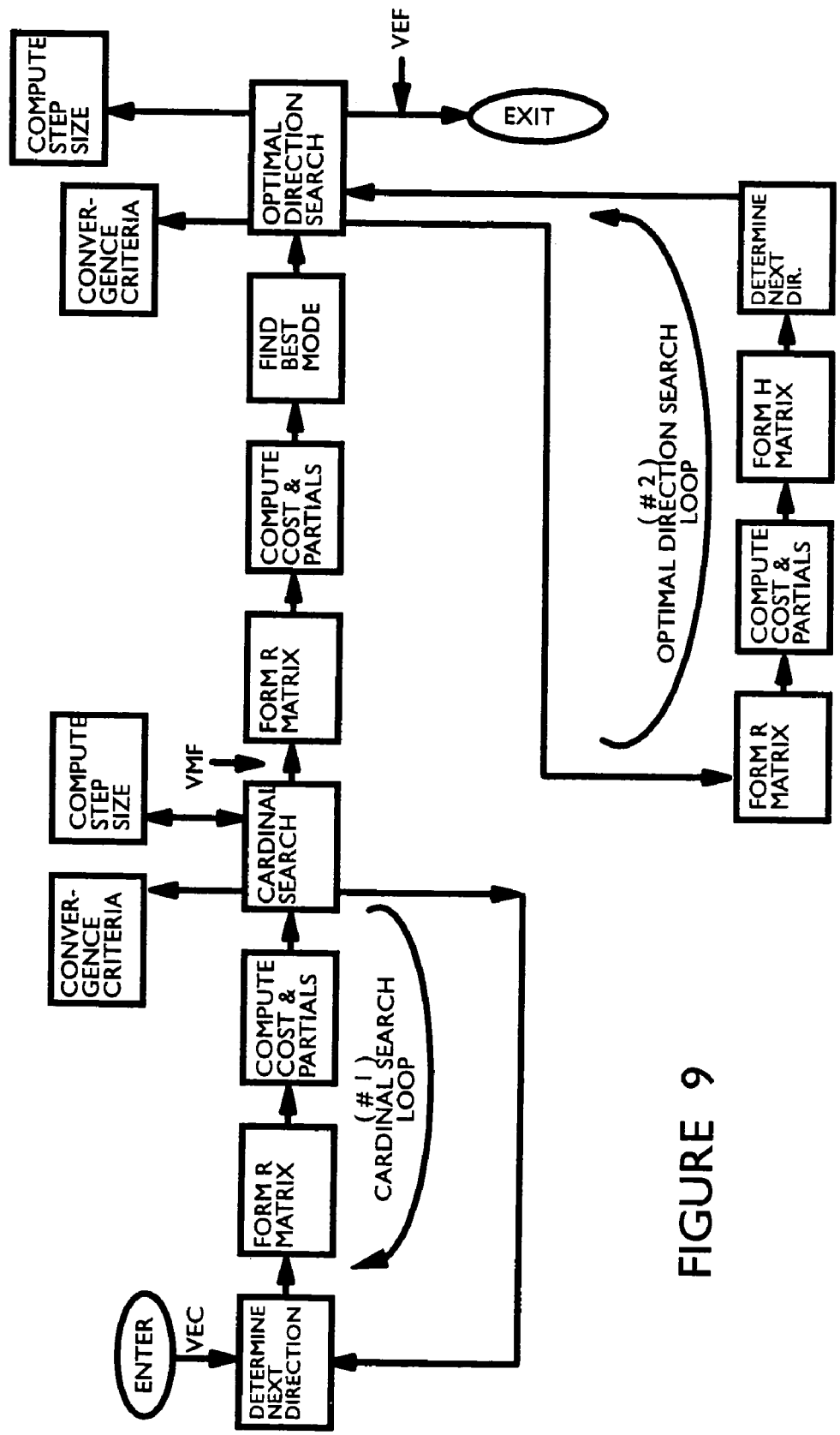
FIG. 9 is a flow diagram to find the minimum velocity of the main lobe of the first cost function and the minium of a selected lobe of the second cost function.

The disclosed Fletcher-Powell algorithm involves two different functional iteration loops and an intermediate step. These loops are illustrated as loops #1 and #2 in FIG. 9. The two loops and intermediate step are as follows:

(a) The Fletcher-Powell algorithm is applied via a first loop that includes a sequence of Cardinal Direction searches, each for a cost function minimum of matrix R (function Y), in a sequentially chosen direction. Each of those Cardinal Searches will require multiple iterations through loop #1 before a cost minimum is found. Whenever a cost minimum (VMF) is found by a Cardinal Search, the Fletcher-Powell algorithm calls for the gradients to be updated and the computed homogenous second partial derivative to be saved. This sequence of events continues until searches along all three cardinal directions have been completed.

(B) At this point, the Fletcher-Powell algorithm is temporarily exited from in order that one of three lobes of the second cost function Y', including the lobe that contains the identified cost minimum, is selected.

(C) After the lobe has been chosen has been chosen from three lobes of the second cost function Y', the Fletcher-Powell algorithm is re-entered for the Optimal Direction search. Using information obtained during the Cardinal Direction searches (loop #1), loop #2 is entered and the H matrix (function Y') is initialized. This is followed by multiple iterations through loop #2, where the H matrix having been initialized, is then updated and used to determine the next direction of search. This process continues until the convergence criteria is met, thus signifying that a cost function minimum has been found and a corresponding vehicle velocity has been found.

Figure 10:
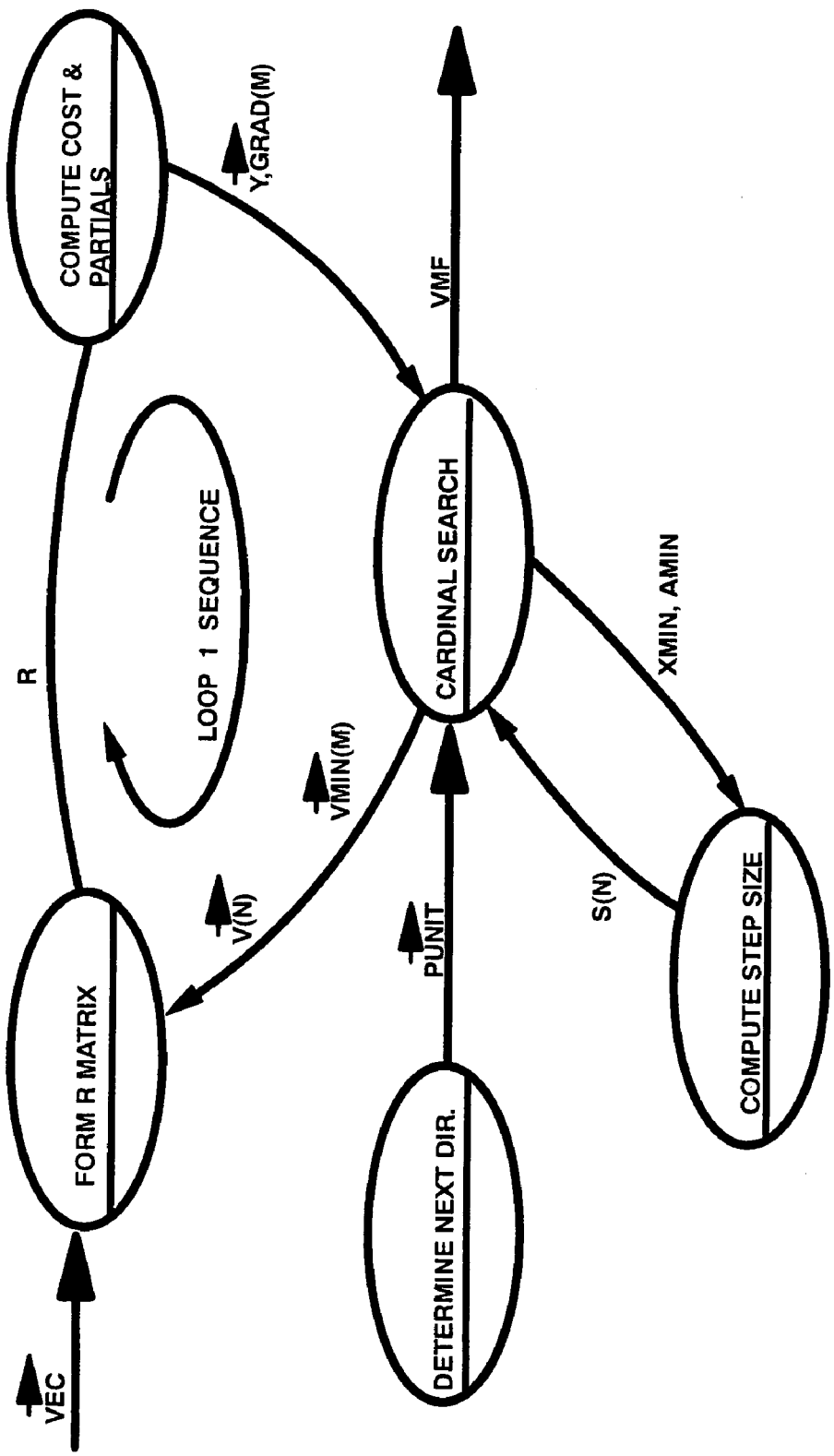
FIG. 10 is a less detailed flow diagram of the Cardinal Search loop.
Figure 11:
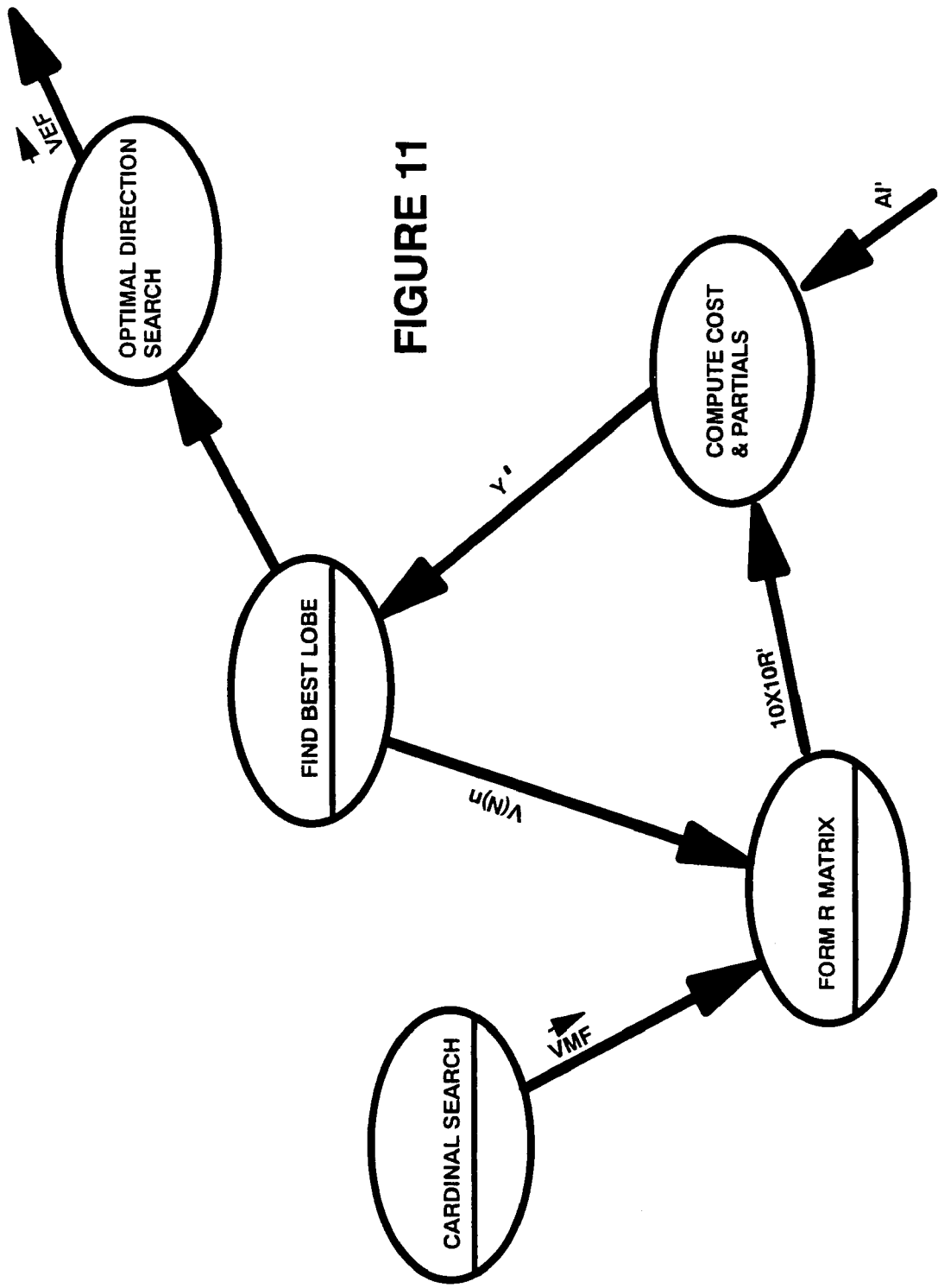
FIG. 11 is a flow diagram to find the Best lobe.

A more detailed discussion of each of the three steps of the preferred embodiment follows:

Cardinal Direction Search Loop (A') A typical sequence through the loop of FIG. 10 commences with a velocity, V(N), being provided to the Form R Matrix function by the Cardinal Search function. For any velocity V(N) the Form R Matrix function shall form a 6×6 matrix (all R matrixes shall be formed using the time TA unless otherwise specified). Availability of the R matrix prompts computation of the cost, Y. The Cardinal Search function combines this cost, and its associated velocity V(N), with corresponding data from previous circuits around this loop, and examines the combination for a cost minimum on a quadratic or cubic fit, depending on the amount of data available. If a fit with an interpolative minimum is found, the velocity of the minimum is output as VMIN(M), and this loop is exited. If a fit with an extrapolative minimum is found, the distance (XMIN) of the extrapolated minimum along the direction of search and an algebraic approximation of the second derivative of distance (AMIN) in the direction of search at the point XMIN are sent to the Compute Step Size function. Compute Step Size responds with the size of the next increment of velocity in the direction of search indicated by PUNIT; the Cardinal Search function converts this to a new velocity, V(N+1), and the processes repeats, basically until an interpolative minimum is found.

At the end of any cardinal search, the cardinal search function compares the vector (VMIN(M)−VMIN(M−1)) to the Convergence Criteria. If it meets the criteria, VMIN(M) is outputted as VMF. If the Convergence Criteria are not met, the cardinal search loop is reentered and iterated until VMIN(M+1) is found, unless the velocity iteration limit, NVELIT, has been reached.

A few added detals of the above described method are as follows:

(a) The Fletcher-Powell sequence is initially entered by entering a velocity VEC into the Form R Matrix function. VEC may be expressed alternately as:

VEC=V(N) N=0

VEC=V(MIN(M) M=0

(b) The velocity which will commence any cardinal search after the first one is the VMIN(M>0) found during the previous cardinal search.

(c) During the first loop circuit of the cardinal search, the Compute Cost and Partials function shall compute the cost gradient GRAD(M) at the point VMIN(M).

Find Best Lobe (B') Superimposed on the Fletcher-Powell algorithm is the requirement to resolve the velocity/cost ambiguity which exists along the eta axis of the N coordinate system. The nature of this requirement, the problem, and the overall method of solution are discussed in the appendix. Implementation of this solution within the functional structure is illustrated in FIG. 10.

When the Cardinal Search function outputs VMF, it is used by the Form R Matrix function to for a 10×10 R' Matrix, using correlation time TA1. The Compute Cost and partials functions responds to the 10×10 R' matrix by computing cost (Y') using the matrix and corresponding 10×10 A1' matrix. The Find Best Lobe function saves the cost with its corresponding velocity, VMF, and sends the Form R Matrix function a velocity change, $V(N)_{N=\pm}C/(2f_0TA)$, which reflects the lobe ambiguity at time TA. The Form R Matrix function computes a new cost minimum using the TA1 time for the three dimensional velocity corresponding to the side lobes of the second cost function Y'. When this process is completed, after also using $V(N)_N=-C/(2f_0TA)$ in Y', the Find Best Lobe function chooses the lobe of the second cost function Y' with the minimum cost. Its associated velocity VMF or VMF+V(N) or VMF−V(N) is then passed to the Optimal Direction Search function.

If TA<0.2 sec, no lobe search is performed. In that case the velocity reported as VMP for the first examined lobe, of the second cost function, will be passed to the Optimal Direction Search function, as VMF.

Figure 12:
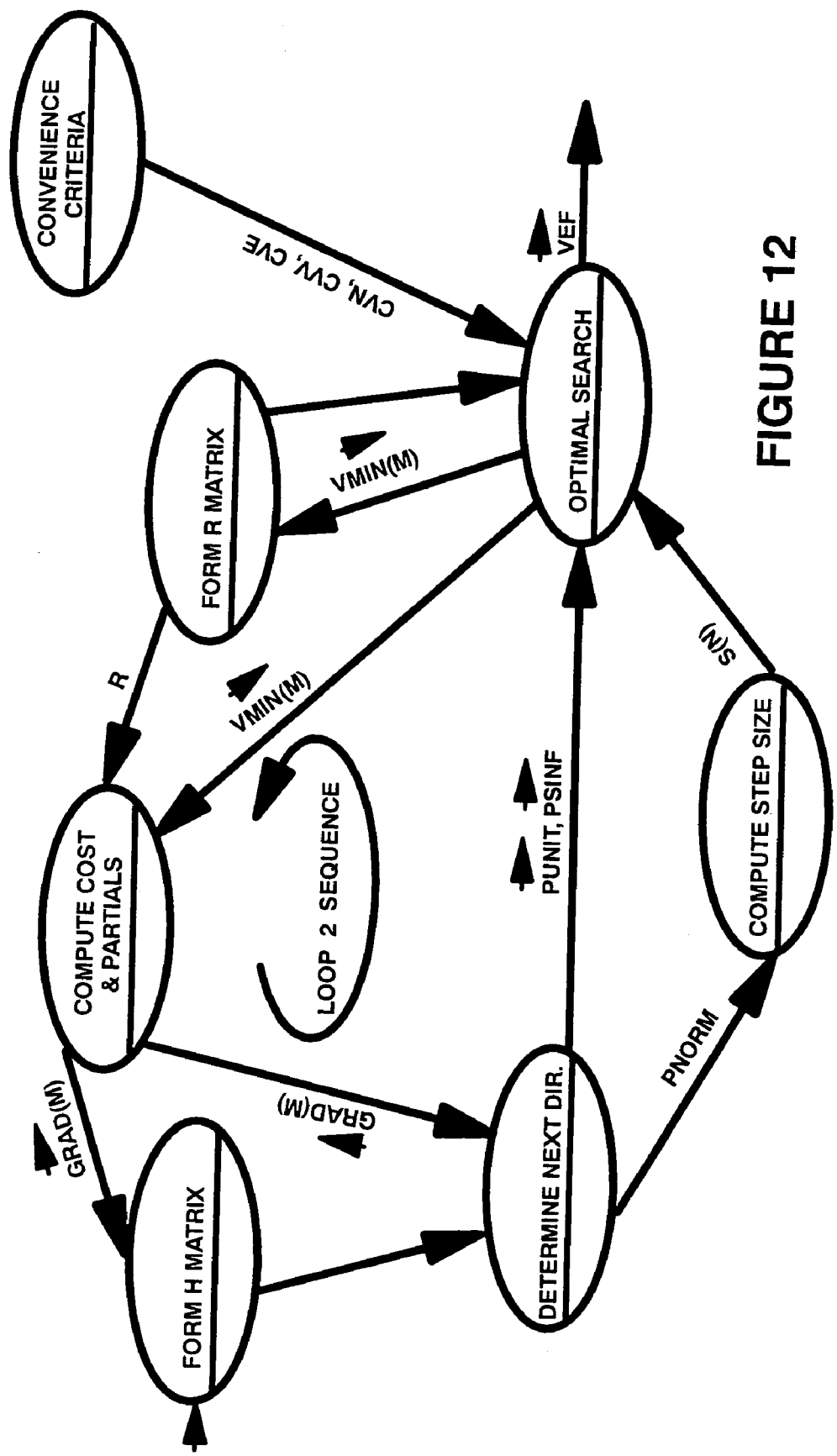
FIG. 12 is less detailed flow diagram of the Optimal Search loop.

Optimal Direction Search Loop (C') Each VMIN(M) from the Cardinal Search function prompts the Compute Cost and Partials function to use the R matrix at VMIN(M) to determine the partial derivatives at VMIN(M), summarized as GRAD(M). These are used to form the H matrix. When the H matrix has bee initially completed, (i.e., at the end of the {cardinal} direction searches) it and GRAD(M) shall be used together by the Determine Next Direction function to determine PSHIF, a vector denoting the estimated direction and distance of the cost minimum in three dimensional velocity space. (PUNIT is the unit vector in that direction, PNORM is the magnitude.) PUNIT provides the Optimal Search function with the next direction of search; PNORM provides the compute Step Size function with the remaining information it needs to compute the next step size, S(N). (See FIG. 12).

At the end of any optimal search the Optimal Search function compares the vector (VMIN(M)−VMIN(M−1)) to the Convergence Criteria. If all components of this vector meet the Convergence Criteria, VMIN(M) is outputted as VEF. VEF is the velocity of vehicle 10 of FIG. 1. If that vector does not meet the convergence criteria, then PSHIF, when it is outputted by the Determine Next Direction function, is compared to the Convergence Criteria by the Optimal Search function. If all components of PSHIF meet the Convergence Criteria, VMIN(M) shall be output as VEF. If the Convergence Criteria are not met, the optimal search-loop is reentered and iterated until VMIN(M−1) is found, unless the velocity iteration limit, NVELIT, has been reached.

VEF represents the culmination of the Fletcher-Powell algorithm in that it is the velocity at minimum cost on the desired lobe of Y'.

Figure 13:
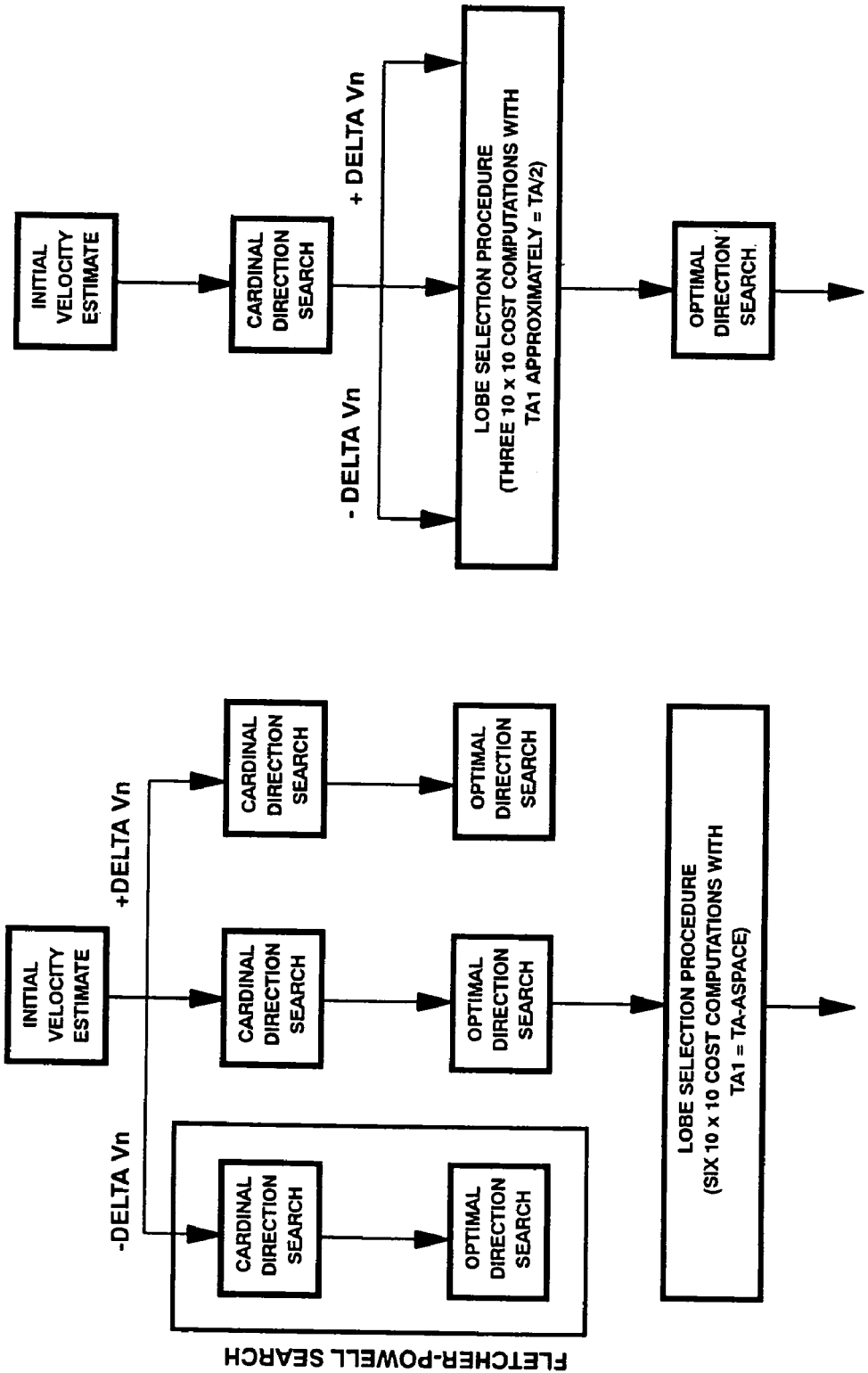
FIG. 13 is a top level flow diagram giving a side-by-side comparison of a three lobe search of the second earlier method and the disclosed modified three lobe search method.

The modified three lobe search method employs a time TA1 approximately equal to one-half of the correlation time T111 of two pulses 25 and 48 that are being correlated, in order to resolve vertical velocity ambiguity, and then refining the velocity estimate via Fletcher-Powell optimal searches until convergence criteria are met, thus saving about one-half of the processing time orginally required to produce a high quality velocity estimate. The use of such a shorter time TA1 is shown in FIG. 13, as part of the modified three lobe search method.

While the present invention has been disclosed in connection with the preferred embodiment thereof, it should be understood that there may be other embodiments which fall within the spirit and scope of the invention as defined by the following claims.

What is claimed is:

1. A modified three lobe search method of finding a vertical velocity of a vehicle, comprising:
   (a) transmitting at least three acoustic pulses from a vehicle submerged in water toward a bottom surface;
   (b) detecting a returned acoustic pulse due to each of the transmitted acoustic pulses on the vehicle, after the transmitted acoustic pulses are reflected toward the vehicle from the bottom surface;
   (c) generating a first cost function from a time that is related to said acoustic pulses;
   (d) obtaining an independently estimated vertical velocity of the vehicle;
   (e) performing Fletcher-Powell cardinal searches on the first cost function beginning with the independently estimated vertical velocity, to find a main lobe velocity at a minimum value of a lobe of the first cost;
   (f) adding a lobe spacing velocity increment to the main lobe velocity, to determine a first side lobe velocity; and
   (g) subtracting a lobe spacing velocity increment from the main lobe velocity, to determine a second side lobe velocity.

2. A modified three lobe search method of finding a vertical velocity of a vehicle, comprising:
   (a) transmitting at least three acoustic pulses from a vehicle submerged in water toward a bottom surface;
   (b) detecting a returned acoustic pulse due to each of the transmitted acoustic pulses on the vehicle, after the transmitted acoustic pulses are reflected toward the vehicle from the bottom surface;
   (c) generating a first cost function from a time that is related to the acoustic pulses;
   (d) obtaining an independently estimated vertical velocity of the vehicle;
   (e) performing Fletcher-Powell cardinal searches on the first cost function beginning with the independently estimated vertical velocity, to find a main lobe velocity at a minimum value of a lobe of the first cost function;
   (f) adding a lobe spacing velocity increment to the main lobe velocity, to determine a first side lobe velocity;
   (g) subtracting a lobe spacing velocity increment from the main lobe velocity, to determine a second side lobe velocity;
   (h) generating a second cost function from another time that is related to the acoustic pulses;
   (i) using the main lobe velocity and first and second side lobe velocities in the second cost function to determine three cost values of the second cost function; and
   (j) selecting a lobe velocity that corresponds to the lowest cost value of the determined three cost values of the second cost function.

3. A modified three lobe search method of finding a vertical velocity of a vehicle, comprising:
   (a) transmitting at least three acoustic pulses from a vehicle submerged in water toward a bottom surface;
   (b) detecting a returned acoustic pulse due to each of the transmitted acoustic pulses on the vehicle, after the three pulses are reflected toward the vehicle from the bottom surface;
   (c) generating first and second cost functions from two times that are related to the acoustic pulses;
   (d) obtaining an approximate estimate of the vertical velocity of the vehicle from an independent source;
   (e) performing Fletcher-Powell cardinal searches on the first cost function that is determined beginning with the approximate estimate of the vertical velocity to find a main lobe velocity at a minimum of a lobe of the first cost;
   (f) adding a lobe spacing velocity increment to the main lobe velocity to determine a first side lobe velocity;
   (g) subtracting a lobe spacing velocity increment from the main lobe velocity to determine a second side lobe velocity;
   (h) using the main lobe velocity and first and second side lobe velocities in the second cost function to determine cost values of the second cost function at said three lobe velocities;
   (i) selecting a lobe velocity that corresponds to the lowest cost value of said three lobe velocities of the second cost function; and
   (j) performing Fletcher-Powell searches on the second cost function, beginning with the selected lobe velocity, to find a minimum lobe velocity at a minimum of a lobe of the second cost function, the minimum lobe velocity being taken as the vertical velocity of the vehicle.

* * * * *